June 23, 1925. 1,542,908

J. E. POINTON

MACHINE FOR THE MIXING AND KNEADING OF BREAD DOUGH

Filed Nov. 12, 1923 2 Sheets-Sheet 1

Inventor
J. E. Pointon
By Marks & Clerk
Attys.

June 23, 1925. 1,542,908
J. E. POINTON
MACHINE FOR THE MIXING AND KNEADING OF BREAD DOUGH
Filed Nov. 12, 1923    2 Sheets-Sheet 2

Inventor
J.E. Pointon
By Marks & Clerk
Attys.

Patented June 23, 1925.

1,542,908

UNITED STATES PATENT OFFICE.

JOHN EDWARD POINTON, OF PETERBOROUGH, ENGLAND, ASSIGNOR TO BAKER-PERKINS COMPANY INCORPORATED, OF WHITE PLAINS, NEW YORK.

MACHINE FOR THE MIXING AND KNEADING OF BREAD DOUGH.

Application filed November 12, 1923. Serial No. 674,413.

*To all whom it may concern:*

Be it known that I, JOHN EDWARD POINTON, a British subject, residing at Westwood Works, Peterborough, in the county of Northants, England, have invented certain new and useful Improvements Relating to Machines for the Mixing and Kneading of Bread Dough, of which the following is a specification.

In the mixing of bread dough by machinery the required materials are placed in a pan or trough which has a trunnion or like bearing and may also have rotating or turning gear arranged integrally therewith. Such a rotatable pan or trough with its trunnion or like bearing and turning gear is made portable or removable by mounting the same upon a wheeled truck or base.

The object of this invention is to facilitate the movement of such pans relatively to the machine or machines with which they are employed and to economically provide for the advantageous use with such machines of a plurality or series of pans or troughs.

The invention comprises the combination in dough-making machines of a container consisting of a plain bowl or the like provided with rollers or castors, a rotatable table or platform formed and arranged integrally with such a machine, and means for the detachable connection of the said bowl to said table so that both may be rotated together.

Referring to the two accompanying sheets of explanatory drawings:—

The same reference letters in the different views indicate the same or similar parts.

Figure 1:
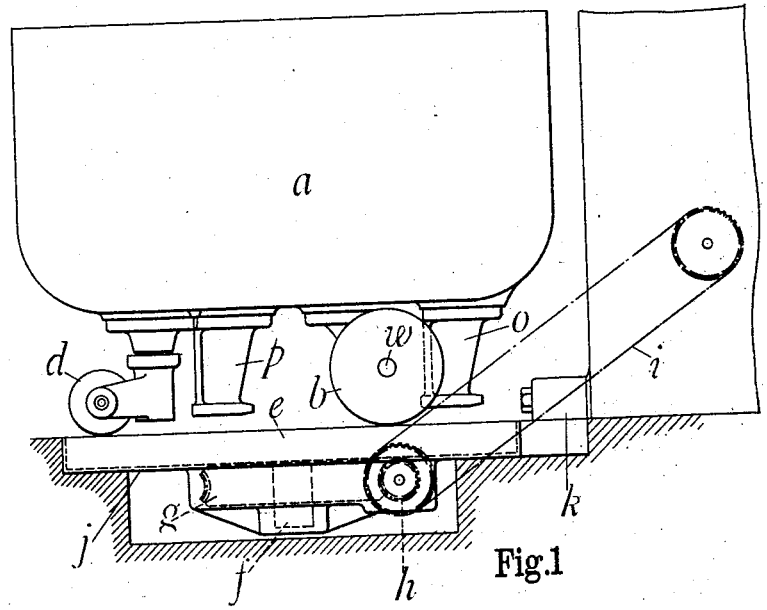
Figure 1 is an elevation, and Figure 2 a plan of a portion of a dough-making or kneading machine to which the invention is applicable.
Figure 2:
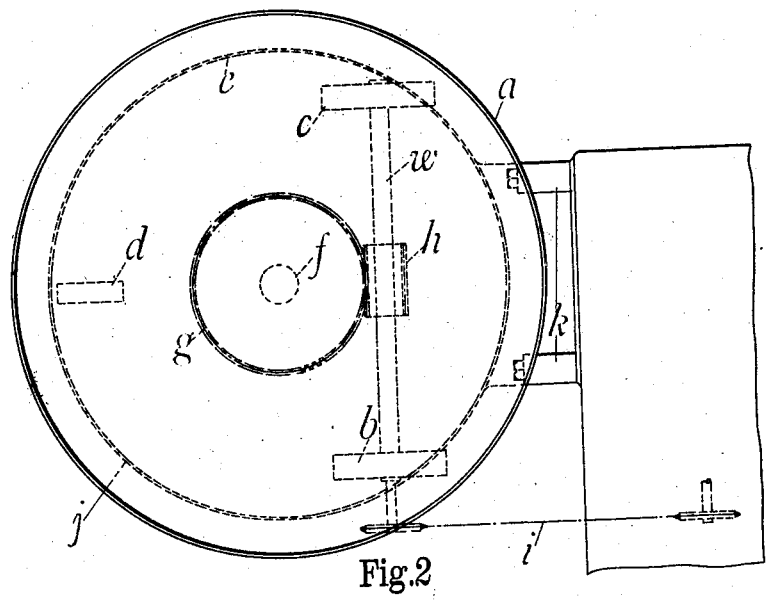

As is shown at Figures 1 and 2, the container $a$ is a plain cylindrical bowl formed from a pressed steel plate or otherwise and fitted beneath its lower or closed end with wheels or runners. Two of such wheels as $b, c$, may be mounted at opposite ends of one axle, while the other $d$ is preferably arranged as a castor, or so that it may partake of a swivelling movement to permit of ready handling of the bowl or receptacle in transit from one position to another.

The revolving table or platform for the bowl or container aforesaid may conveniently be formed from a disc $e$ of sufficient diameter to serve as a platform for the reception of the bowl $a$ and having projecting from its under side a pin or gudgeon $f$ on which is secured a worm wheel $g$, the latter being engaged by a worm $h$ driven in any convenient manner from the machine of which the said table or platform is a part. In the example illustrated the driving of the platform is effected through the medium of chain gearing $i$.

The rotatable table or platform $e$ is housed or mounted within a casing $j$ which is placed beneath the floor level as shown and bolted at $k$ to the lower end of the framing of the machine.

Figure 4:
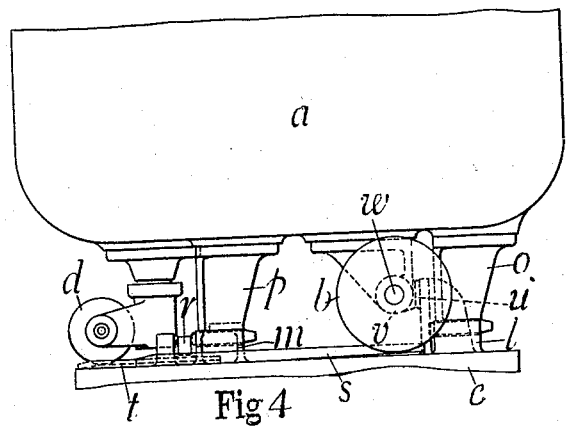
Figure 4 is a side elevation, and Figure 5 a front elevation showing the bowl and table in detachable connection in accordance with this invention.
Figure 5:
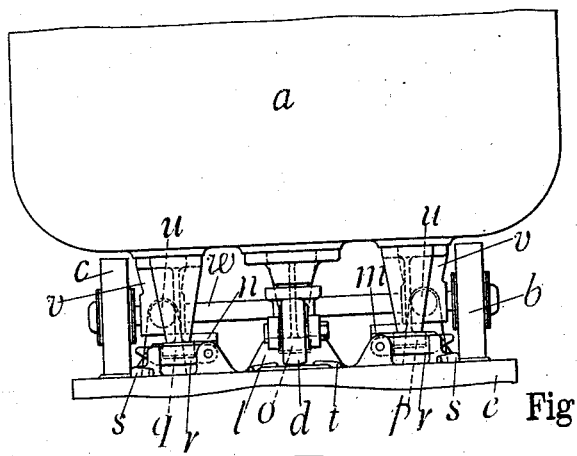
Figure 3:
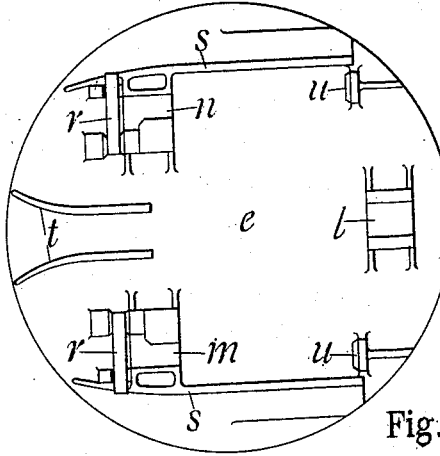
Figure 3 is a plan of the rotatable table, whilst

The preferred means for the detachable connection of the bowl to the platform $e$ are illustrated at Figures 3, 4 and 5.

On the upper surface of the platform $e$ there are lugs or shoes as $l, m, n$, formed with or secured to the platform, and to the under surface of the bowl $a$ there are attached the feet or locating members $o, p, q$ which respectively engage the aforesaid shoes when the bowl is wheeled on the platform. The shoes $m$ and $n$ are fitted with hinged latches as $r$. The platform is also provided with guards as $s$ for the bowl wheels $b$ and $c$ and as $t$ for the castor $d$, and with abutments or buffer stops as $u$ for the brackets $v$ secured to the bowl; such brackets serve as buffers in addition to carrying the axle $w$ of the wheels $b, c$.

The bowl $a$ is wheeled or pushed on to the platform $e$, in the direction indicated by the arrow at Figure 3, until it is brought to rest by the contact of the said brackets $v$ with the abutments. The aforesaid latches $r$ are (prior to the pushing of the bowl on to the platform) turned on their hinges to the out of service position to permit the locating members $p, q$, to pass into engagement with the shoes, $m, n$, as the bowl is wheeled on to the platform. When the bowl is in position on the platform the latches $r$ are brought back to the service position, shown at Figures 3 and 5, to prevent withdrawal of the bowl. The latter is thus retained against movement on its wheels by the said latches $r$ in the one direction and by the abutments or buffer stops $u$ in the opposite direction, whilst lateral movement is prevented by the engagement of the feet or locating members, $o$, $p$, $q$, with the shoes $l$, $m$, $n$.

Having thus described my invention, what I claim as new and desire to secure by Letters Patent is:—

1. In a dough mixing and kneading machine, the combination comprising a portable bowl, a rotatable platform housed in said machine, locating members on said bowl, shoes on said platform to engage said locating members, and latches on said shoes, as set forth.

2. In a dough mixing and kneading machine, the combination comprising a portable bowl, a rotatable platform housed in said machine, locating members and buffers on said bowl, and shoes and abutments on said platform, said shoes engaging said locating members and said abutments providing stops for said buffers, as set forth.

3. In a dough mixing and kneading machine, the combination comprising a portable bowl, runners, locating members and buffers on said bowl, a platform housed in said machine, a gudgeon integral with and projecting below said platform, means consisting in part of a gear wheel secured to said gudgeon for rotating the platform, and runner guards, locating shoes, shoe latches, and buffer stops integral with and projecting above the platform, as set forth.

In testimony whereof I have signed my name to this specification.

JOHN EDWARD POINTON.